No. 730,817. PATENTED JUNE 9, 1903.
M. CULLEN.
CATCH BASIN.
APPLICATION FILED JULY 25, 1902.
NO MODEL.
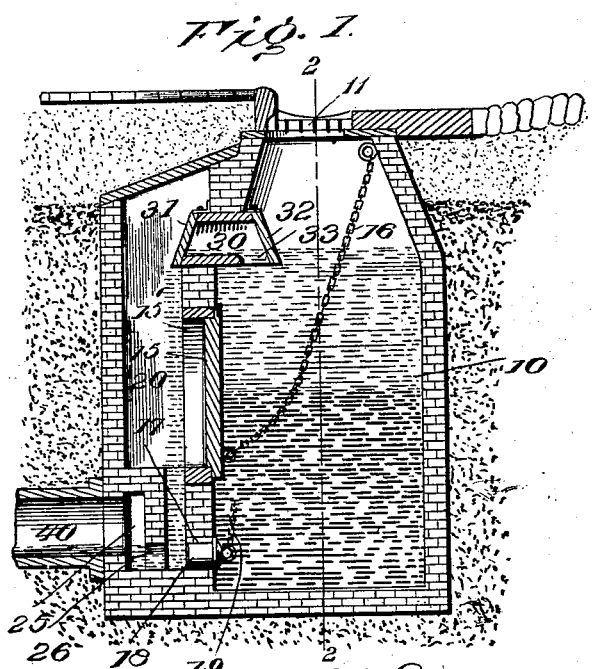
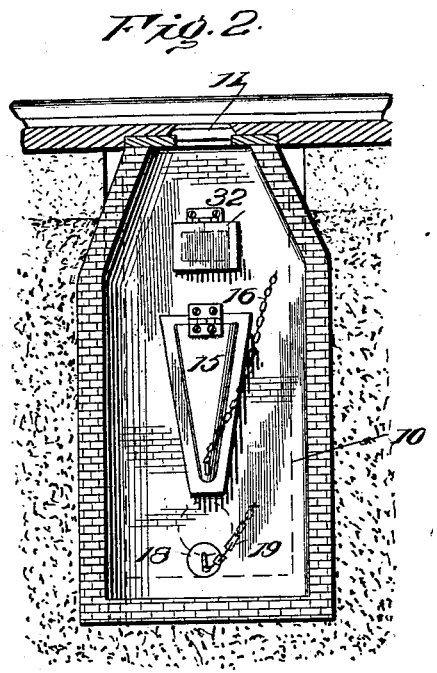
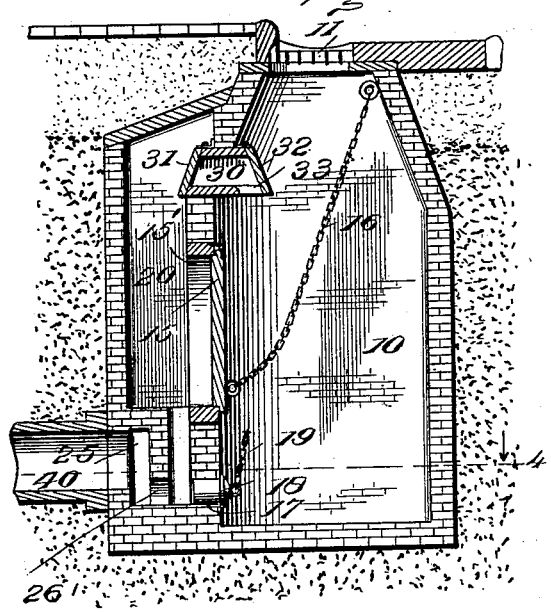
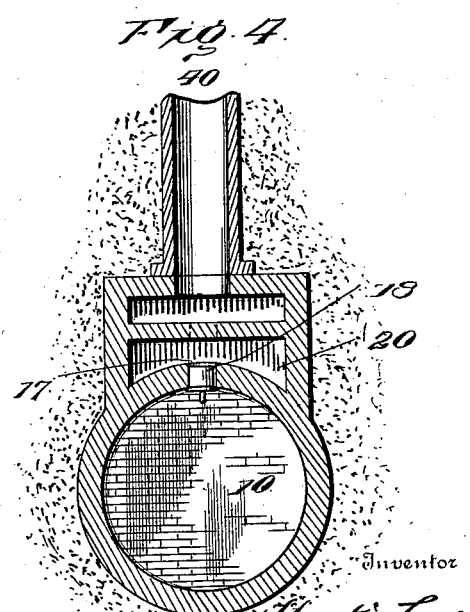
Witnesses
Inventor
By
Attorney No. 730,817. Patented June 9, 1903.

UNITED STATES PATENT OFFICE.

MARTIN CULLEN, OF BOSTON, MASSACHUSETTS.

CATCH-BASIN.

SPECIFICATION forming part of Letters Patent No. 730,817, dated June 9, 1903.

Application filed July 25, 1902. Serial No. 116,950. (No model.)

*To all whom it may concern:*

Be it known that I, MARTIN CULLEN, a citizen of the United States, residing at Boston, in the county of Suffolk, in the State of Massachusetts, have invented certain new and useful Improvements in Catch-Basins, of which the following is a specification.

This invention relates to a catch-basin which is connected with a sewer and which is adapted to receive the water from the street.

The object of the invention is to provide a catch-basin from which the sediment may be removed free from any appreciable amount of water, thereby lessening the labor and reducing the cost of clearing out such basins.

Another object is to produce a basin to which ready access may be had for the purpose of cleaning it from deposits of solid matter and which is provided with means for preventing the escape of obnoxious gases from the sewer with which it is connected.

In clearing out the ordinary catch-basin of street-sewers it is usually necessary to take out with the sediment a large amount of water mixed therewith. This removal of the water with the solid or semisolid matter necessitates a large amount of work being done and greatly increases the cost of clearing out the basin.

Figure 1 of the accompanying drawings represents a central vertical section of this improved sewer catch-basin, showing the water and sediment therein in a condition ready for cleaning out. Fig. 2 represents a vertical section taken on line 2 2 of Fig. 1, the side wall of the basin in which the openings and doors are located being shown in front elevation. Fig. 3 represents a view similar to that shown in Fig. 1 with the contents removed and the basin in cleansed condition. Fig. 4 represents a horizontal section taken on line 4 4 of Fig. 3.

The same reference-numerals indicate corresponding parts in all the figures.

The basin 10 may be of any desired or usual form, and, as shown, it is made cylindrical throughout the greater part of its height, being reduced at its upper end and provided with the ordinary cover or grating 11.

A chamber 20 is built at one side of the basin 10 and preferably extends to a point near the top thereof. This chamber is adapted to receive the overflow from the basin 10 through a trap 30, preferably disposed near the top of the chamber, and the chamber is connected at its bottom with a sewer-pipe 40. The trap 30 comprises a box-like structure disposed in an opening in the partition-wall between the basin 10 and the chamber 20 and has one end thereof opening into the basin and the other end into the chamber 20. These ends are preferably made slanting outwardly toward the bottom and are closed by hinged trap-doors 31 and 32 for shutting out the sewer-gas from the basin. The end of the trap which extends into the basin 10 has an opening 33 in its bottom, which permits the overflowing water to rise therein and force open the doors 31 and 32, thereby permitting the water to pass from the basin to the overflow-chamber.

An inwardly-opening triangular iron door 15 is hung below the trap 30 in the same side of the basin 10 and affords an outlet from the basin to the chamber 20 through an opening 15' for the superfluous water remaining in the basin after its overflow through the trap 30 has ceased. This door is hinged at the top of the opening 15' and the pointed end thereof extends downward into the basin. Any suitable means for opening the door 15 may be provided. The means herein shown comprise a chain 16, fastened at one end to the lower end of the door and at its other end to an eye or staple at the top of the basin, so that easy access thereto may be had by a person on the sidewalk by lifting off the grating 11. The door being made triangular in shape, with its narrow point at the bottom, permits it to be easily forced through the accumulated sediment by pulling on the chain 16. The lifting of this door 15 allows the water to be drained off through the opening 15' into the chamber 20, from whence it passes to the sewer 40. When the water has been thus drained off, the chain is released and the door 15 under the force of gravity drops into closed position, and the sediment may then be bailed out or otherwise removed, the door 15 preventing any sewer-gas from passing into the basin through the opening 15'. An opening 17 is also formed in the partition-wall at a point flush with the bottom of the chamber 20. This opening 17 is closed by a plug 18, which opens inwardly and is attached to the wall of the basin 10 by a safety-chain 19. This opening between the basin and the chamber at a point flush with the bottom of the chamber permits any sediment to be removed from the chamber therethrough in case any should have been carried thereinto during the draining operation.

The chamber 20 is preferably divided at its lower end into an open and a closed chamber. The closed chamber 25 has an opening 26 at the lower end thereof which communicates with the open chamber at a point diametrically opposite the opening 17. This covered chamber 25 serves as a shield for the mouth of the sewer 40 and protects it against the overflow sediment which might otherwise clog the opening into the sewer.

In the use of this invention when it is desired to clean out the basin the grating 11 is removed and the chain 16 is drawn or pulled upward, causing the door 15 to be raised and the superfluous water to pass out through the opening 15' into the chamber 20. When the water has been drained off, the chain is released and the door 15 drops into closed position. The sediment is then removed from the bottom of the basin in any desired manner. After removing the deposit from the basin the plug 18 is removed and any sediment in the bottom of the chamber 20 is taken out through the opening 17 and the plug replaced.

I claim as my invention—

1. The combination of a catch-basin, an overflow-chamber, a trap connecting the upper portions of said chamber and basin, means for connecting the bottoms thereof, and a sediment-drain disposed between said top and bottom connections.

2. The combination of a catch-basin, an overflow-chamber, an overflow-trap connecting said chamber and basin near their tops, a drain-door disposed below said overflow-trap, and connecting said chamber and basin, and a conduit connecting said chamber and basin at a point flush with the bottom of said chamber.

3. A catch-basin provided with a drain-opening and with an elongated tapering door for closure thereof, said door being hinged at its broad upper end above said drain-opening, and its elongated tapering form adapting it to open inward through accumulated sediment.

4. The combination of a catch-basin provided with a drain-opening in its side wall, an elongated tapering door for closing said opening, said door being hinged at its broad upper end above said drain-opening and its elongated tapering form adapting it to open inward through accumulated sediment, and means for opening said door from a point above the basin.

5. The combination of a catch-basin, an overflow-chamber, a trap connecting the upper portion of said chamber and basin, means for automatically closing said trap, a drain-opening disposed below said overflow and above the bottom of said basin, and means for connecting said chamber and basin at a point flush with the bottom of said chamber.

MARTIN CULLEN.

Witnesses:
WILLIAM A. HAYES,
CHESTER A. NEAD.